(No Model.)
J. P. ANDERSON.
FRUIT CLIPPER.
No. 547,408. Patented Oct. 8, 1895.
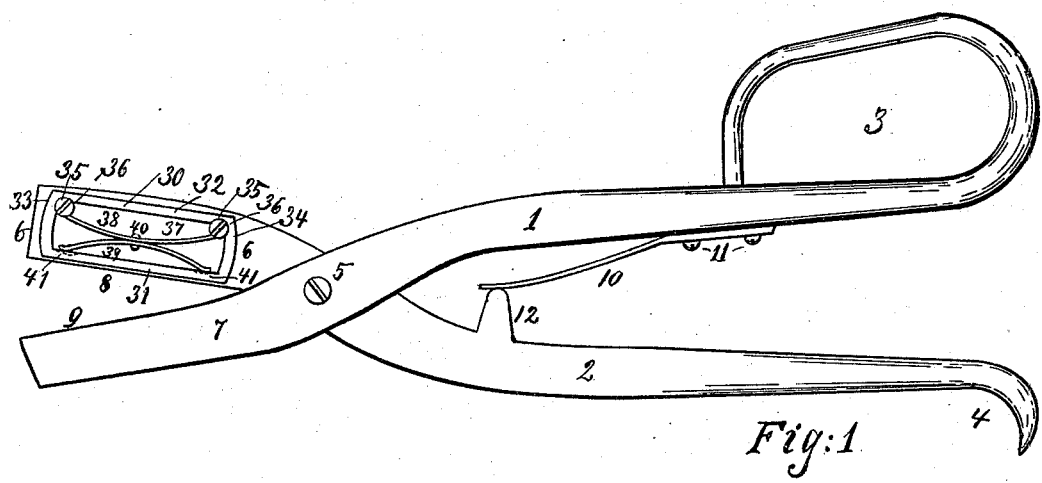
Fig. 1
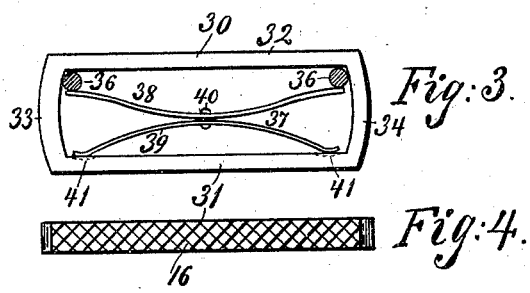
Fig. 3
Fig. 4
Fig. 5
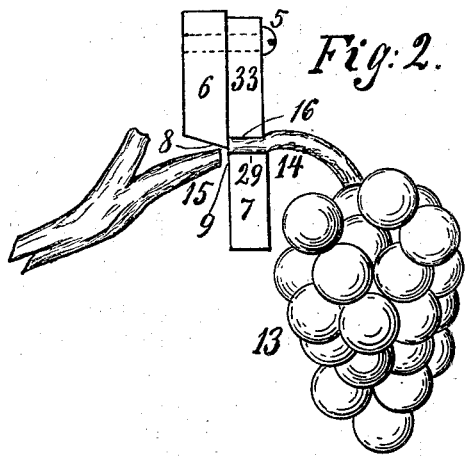
Fig. 2
WITNESSES:
D. A. Carlsen
P. Carlsen
INVENTOR:
John P. Anderson
BY his ATTORNEY:
A. M. Carlsen

UNITED STATES PATENT OFFICE.

JOHN P. ANDERSON, OF ATLANTIC, IOWA.

FRUIT-CLIPPER.

SPECIFICATION forming part of Letters Patent No. 547,408, dated October 8, 1895.

Application filed April 6, 1893. Serial No. 469,360. (No model.)

*To all whom it may concern:*

Be it known that I, JOHN P. ANDERSON, a citizen of the United States, residing at Atlantic, in the county of Cass and State of Iowa, have invented certain new and useful Improvements in Fruit-Clippers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in implements for cutting fruits and flowers from the bushes or trees on which they grow.

The object of my invention is to provide a hand-tool in the shape of a clipper or shears of such construction that it may be held in and operated by one hand, clipping off the stem of a fruit or a bunch of grapes or flowers, &c., and hold the fruit by the stem until it is placed in a basket or other receptacle, when it may be readily released by the opening of the clipper. I attain this object by the construction and arrangement of parts illustrated in the accompanying drawings, in which—

Figure 1 is a side view of my fruit-clipper. Fig. 2 is a front end view of the jaws and means for holding the fruit-stem. Fig. 3 is a side elevation of the spring-held yoke, by which the fruit-stem is held against the lower jaw. Fig. 4 is a bottom view of Fig. 3. Fig. 5 is a top view of the spring, located inside the yoke and pressing it downward.

Referring to the several parts in the drawings by reference, numerals 1 and 2 designate a pair of levers, of which the upper one is provided with a bow 3, adapted to go upon the thumb of the operator's hand. The other is provided with a hook 4 to prevent it from slipping forward out of the fingers, grabbing over the lever 2, in using the rear portions of the levers as handles of the implement. The front portions of the levers are crossed over each other and pivoted together by a pivot-screw 5, beyond which they are formed into shear-jaws 6 and 7, provided with cutting-edges 8 and 9, which, when the jaws close, work in conjunction, cutting off the stem of the fruit, as shown in Fig. 2.

10 is a spring secured by screws or rivets 11 to the lever 1. The front end of said spring 10 bears against the top of the boss 12, formed at the inner side of the lever 2. This spring tends at all times to keep the handles spread and the jaws 6 and 7 open. The closing of the implement against the resistance of the spring 10 is caused by a closing pressure of the operator's hand, holding the handles in the manner already described.

13 represents a cluster of fruit with its stem 14 15 just severed by the instrument. It will be observed that the portion 14 of the stem is being firmly held between the upper face 29 of the jaw 7 and the corrugated surface 16 of a stem-holding yoke 30, which is formed of the two parallel bars 31 32 and the two short transverse and segmentally-shaped end bars 33 34, uniting the long bars. This yoke is held upon the side of the jaw 6 by the heads 35 of the two screws 36, which are screwed tightly into screw-threaded holes in the jaw and have one side of their heads overhanging the inner edge of the end bars 33 34 of the yoke, said end bars sliding up and down between the screw-heads and the face of the jaw.

37 is a spring formed of two segmental-shaped flat springs 38 and 39, united together by a rivet 40 at their middle. The ends of the upper spring 38 touch up under the screws 36, as shown in Fig. 3, while the ends of the lower spring are slightly let down into the dents 41 in the inner side of the lower bar 31. Thus an X-shaped or bifurcated double spring is formed, which tends at all times to hold the lower bar of the yoke almost out to the edge 8 of the jaw 6 and the upper bar 32, resting upon the upper sides of the screws 36. When the implement is closed with a stem of a fruit between the lower and corrugated bar 31 and the jaw 7, the yoke moves upward against the resistance of the spring 37, until, if required, the upper and lower ends of the springs are by the bar 31 closed together against the under sides of the screws 36.

Having thus described my invention, what I claim, and desire to secure by Letters Patent, is—

In a fruit clipper the combination with the handles 1, 2, jaws 6, 7, having the cutting edges 8, 9, and pivot joint 5, of the stem-holding yoke 30, having the two longitudinal bars 31, 32, the lower side of the lower bar being corrugated, the transverse bars 33, 34, the screws 36, secured in the jaw and having one side of their heads loosely overhanging the inner edges of the said end bars 33, 34, the X-shaped spring 37, having two of its ends pressing up under the screws 36, and its other two ends pressing down upon the inner side of the lower bar of the yoke, substantially as shown and described, and for the purpose set forth.

In testimony whereof I affix my signature in presence of two witnesses.

JOHN P. ANDERSON.

Witnesses:
NIELS ANDERSEN,
JOHN A. SPOOR.